US010936659B2

(12) United States Patent
Niebielski et al.

(10) Patent No.: US 10,936,659 B2
(45) Date of Patent: Mar. 2, 2021

(54) PARALLEL GRAPH EVENTS PROCESSING

(71) Applicant: INTERNATIONAL BUSINESS MACHINES CORPORATION, Armonk, NY (US)

(72) Inventors: Tomasz Niebielski, Cracow (PL); Jaroslaw Jurowicz, Cracow (PL); Wojciech Wojcik, Bochnia (PL); Bartosz Tomasik, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 16/237,863

(22) Filed: Jan. 2, 2019

(65) Prior Publication Data
US 2020/0210481 A1 Jul. 2, 2020

(51) Int. Cl.
*G06F 16/30* (2019.01)
*G06F 16/901* (2019.01)
*G06F 16/27* (2019.01)
*G06F 16/23* (2019.01)
*G06F 16/2455* (2019.01)

(52) U.S. Cl.
CPC ...... *G06F 16/9024* (2019.01); *G06F 16/2365* (2019.01); *G06F 16/2379* (2019.01); *G06F 16/24568* (2019.01); *G06F 16/27* (2019.01)

(58) Field of Classification Search
CPC .............. G06F 16/182; G06F 16/9024; G06F 16/24568; G06F 16/2379; G06F 16/2365
USPC ....... 707/607, 609, 687, 705, 769, 790, 813, 707/821
See application file for complete search history.

(56) References Cited

U.S. PATENT DOCUMENTS

| 7,490,083 | B2 | 2/2009 | Bourbonnais et al. |
| 8,214,588 | B2 | 7/2012 | Zohar et al. |
| 8,819,078 | B2 | 8/2014 | Roy et al. |
| 9,542,662 | B2 | 1/2017 | Roesch et al. |
| 9,667,641 | B2 | 5/2017 | Muddu et al. |
| 9,672,082 | B2 | 6/2017 | Thukkaram et al. |
| 2015/0234936 | A1 | 8/2015 | Hu et al. |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Sana A Al-Hashemi
(74) *Attorney, Agent, or Firm* — Anthony M. Pallone (57) ABSTRACT

A computer-implemented method for processing an update event for a target graph may be provided. The method comprises upon an event broker receiving a vertex update event, assigning the vertex update event to a compute node which processes update events for the vertex. Upon the event broker receiving an update event targeting a linking edge in the target graph, performing by the event broker: dividing the update event into a pair of create-if-not-exist sub-events, and an edge update sub-event, assigning the first create-if-not-exist sub-event to a first compute node, and integrating the first create-if-not-exist sub-event into a stream of update events for the first vertex. The same happens for the second vertex. The edge update sub-event is assigned to a third compute node, and integrates into the edge update sub-event stream.

20 Claims, 7 Drawing Sheets

(56) References Cited

U.S. PATENT DOCUMENTS

2016/0360336 A1* 12/2016 Gross ................ H04M 1/72583
2016/0360382 A1* 12/2016 Gross .................. G06F 3/04883
2017/0046038 A1*  2/2017 Hajas .................. G06F 3/04883
2017/0364534 A1* 12/2017 Zhang .................... G06F 16/182
2017/0371952 A1   12/2017 Nelamangala et al.
2018/0268077 A1    9/2018 Gianetto et al.

OTHER PUBLICATIONS

Wright, "GraphStreaming", gephi/gephi Wiki-GitHub, Jun. 17, 2018, 7 pages.
Hirzel, "Partition and Compose: Parallel Complex Event Processing", DEBS '12, Jul. 16-20, 2012, pp. 191-200.
Mayer et al., "Predictable Low-Latency Event Detection with Parallel Complex Event Processing", Copyright 2015 IEEE, 13 pages.

* cited by examiner

100

```
┌─────────────────────────────────────────────────┐
│ 102  assigning the vertex update to a compute   │
│ node if receiving an vertex update event        │
│ targeting a vertex in the target graph          │
└─────────────────────────────────────────────────┘

┌─────────────────────────────────────────────────┐
│ 104  if receiving an edge update event:         │
│   ┌─────────────────────────────────────────┐   │
│   │ 106  dividing the update event          │   │
│   └─────────────────────────────────────────┘   │
│                      ↓                          │
│   ┌─────────────────────────────────────────┐   │
│   │ 108  assigning a 1st vertex update to a │   │
│   │      1st node                           │   │
│   │ 110  integrating the update event into  │   │
│   │      a stream of event directed at the  │   │
│   │      1st compute node                   │   │
│   └─────────────────────────────────────────┘   │
│   ┌─────────────────────────────────────────┐   │
│   │ 112  assigning a 2nd vertex update to a │   │
│   │      2nd node                           │   │
│   │ 114  integrating the update event into  │   │
│   │      a stream of event directed at the  │   │
│   │      1st compute node                   │   │
│   └─────────────────────────────────────────┘   │
│                      ↓                          │
│   ┌─────────────────────────────────────────┐   │
│   │ 116  assigning a edge update to a 3rd   │   │
│   │      node                               │   │
│   │ 118  integrating the edge update        │   │
│   │      sub-event into a related stream of │   │
│   │      update events                      │   │
│   └─────────────────────────────────────────┘   │
└─────────────────────────────────────────────────┘
```

PARALLEL GRAPH EVENTS PROCESSING

FIELD OF THE INVENTION

The invention relates generally to a method for processing streaming data, and more specifically, to a computer-implemented method for processing an update event for a target graph comprising a plurality of vertices and linking edges between vertices. The invention relates further to a related system for processing an update event for a target graph, and a computer program product.

BACKGROUND

The currently ongoing digitization of the physical world—also denoted as Internet of Things (IoT), Industry 4.0 or in general, digitization—generates "ton of events" and related measurement values of physical environmental and/or machine or status parameter values. The instrumentalization of manufacturing equipment, logistic chains and delivery vehicles and data from mobile devices (like positioning data), just to name a few, result in a constant stream of data and parameter values never seen before. Although so-called edge computing tries to compress and preprocess sensor data at the location of the origin, i.e., very close to or as part of an extended (by processing power) sensor, there are still large amounts of data that are transmitted over the Internet to central servers, very often operated in cloud computing centers.

Traditionally, single measurement values have been transmitted to a server which may have stored the measurement value to a database from which the values may be accessed and used for further processing. The amount of data received has been relatively small.

These days, the sensor-equipped world sends a constant data stream or event stream instead. Processing of event streams may include applications such as financial tickers, network performance measuring tools, click stream analysis tools, order entry systems of large web shops, electronic payment systems, automotive traffic monitoring, weather data, video streams and the like. Such applications have increased the requirement for a new type of application that can process the related data streams. The management and data processing for these types of event stream-based applications involve building data management and querying capabilities with a strong temporal focus. Additionally, a different kind of querying mechanism is needed that allows long-running queries over continuous unbounded sets of data. The requirement for processing even larger amounts of incoming event stream data increases more or less on a daily basis. In particular, the integration of the measurement values into retrievable storage systems in the right sequence remains a key industry challenge.

SUMMARY

According to one aspect of the present invention, a computer-implemented method for processing an update event for a target graph may be provided. The target graph may include a plurality of vertices and linking edges between vertices of vertex pairs included in the plurality of vertices. The method may include: upon an event broker receiving a vertex update event targeting a vertex in the target graph, assigning, by the event broker, the vertex update event to a compute node which processes update events for the vertex. Thereby, the vertex update event may include an update parameter value for a property of the vertex.

Furthermore, the method may include: upon the event broker receiving an update event targeting a linking edge in the target graph, performing by the event broker, a series of activities including: dividing the update event into a pair of first and second create-if-not-exist sub-events and an edge update sub-event. The first sub-event relates to a first vertex of a vertex pair. The second sub-event relates to a second vertex of the vertex pair. The method may include assigning the first sub-event directed at the first vertex to a first compute node relating to update events for the first vertex. The method may include integrating the first sub-event into a stream of update events for the first vertex. The method may include assigning the second sub-event directed at the second vertex to a second compute node relating to update events for the second vertex. The method may include integrating the second sub-event into a stream of update events for the second vertex. The method may include assigning the edge update sub-event directed at a linking edge between the first vertex and the second vertex to a third compute node. The method may include integrating the edge update sub-event into a related stream of update events.

According to another aspect of the present invention, an event update system for processing an update event for a target graph may be provided. The target graph may include a plurality of vertices and linking edges between vertices of vertex pairs included in the plurality of vertices. The event update system may include a plurality of compute nodes, and an event broker unit adapted for: upon the event broker unit receiving a vertex update event, targeting a vertex in the target graph, wherein the vertex update event includes an update parameter value for a property of the vertex. The event broker unit may include an assignment unit adapted for assigning the vertex update event to a dedicated compute node out of the plurality of compute nodes. The dedicated compute node may be adapted for processing update events for the vertex.

The event broker unit may also be adapted for: upon the event broker receiving an update event, targeting a linking edge in the target graph, and wherein the event broker unit is also adapted for performing a series of activities including: dividing the update event into a pair of create-if-not-exist sub-events, one of which relates to a first vertex of a vertex pair and the other relates to a second vertex of a vertex pair, and an edge update sub-event; assigning the first create-if-not-exist sub-event directed at the first vertex to a first compute node out of the plurality of compute nodes, the first compute node relating to update events for the first vertex; integrating the first create-if-not-exist sub-event into a stream of update events for the first vertex; assigning the second create-if-not-exist sub-event directed at the second vertex to a second compute node out of the plurality of compute nodes, the second compute node relating to update events for the second vertex; integrating the second create-if-not-exist sub-event into a stream of update events for the second vertex; assigning the edge update sub-event directed at a linking edge between the first vertex and the second vertex to a third compute node out of the plurality of compute node; and integrating the edge update sub-event into a related stream of update events.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'update event' may denote a message being sent from a source system including information about parameter values relating to a vertex or a linking edge—the edge relating to a pair of vertices—in a target graph. The message may be received by an event broker for managing a processing in one of a plurality of compute nodes.

The term 'stream of update events' may denote a sequence of update events ordered by a timestamp.

The term 'target graph' may relate to a relationship diagram including a plurality of vertices, each of which with assigned one or more parameters to be stored as parameter values of the vertex. Each vertex of a pair of vertices—or a subset of pairs of vertices—may be connected, i.e., linked by a so-called edge. Each vertex and optionally each linking edge is uniquely identifiable by a related unique identifier (normally, it is sufficient to identify an edge by the source, i.e., first, and the target, i.e., second, vertex and eventually by the type of relationship). For simplicity reasons, it may also be assumed that and delete operations are not addressed as part of this document. Additionally, each edge must always have a valid source and target vertex; thus, if an edge may be created in the target graph—in particular, and the related database—and no source and/or target vertex exists, and the missing vertex has to be created before.

The term 'linking edge' may denote connections or links representing relationships and/or dependencies of vertices in a graph. Each type of edge may carry one type of relationship. More than one linking edge may connect two dedicated vertices. An edge may be defined by a source and a target vertex identifier and the type of edge. A specific identifier for the edge is not required.

The term 'event broker' may denote a mediator program or mediator system between a publisher of notifications or messages—e.g., source system—and a consumer of notifications—also known as subscriber. The event broker may typically be a part of an event driven architecture, e.g., a service-oriented architecture (SOA). A set of attributes may be assigned to the publisher's event or the subscriber's event handler. The publisher and the subscriber do not need to know each other during design time. They may be wired up during runtime. The event broker may handle these assignments.

The term 'vertex update event' may denote an update event—i.e., update message—being directed at a vertex of a target graph. The update event may include one or more parameter values, characterizing a specific vertex. Because every vertex is uniquely identifiable, the vertex update event may contain a vertex identifier (a read only property or parameter of the vertex) and optionally editable properties.

The term 'update parameter value' may denote a specific parameter value to be assigned to a parameter of a vertex. It may be noted that a differentiation may be made between the abstract storage field parameter of a vertex and a related parameter value being stored in the parameter field, or the related storage cell of the vertex.

The term 'compute node' may denote a computer system receiving information, e.g., update events from a message broker for a processing of the received information/data. A part of the processing may be directed to an update of vertex parameters or an edge parameter in a target graph stored in the database (or any other suitable data structure or storage device).

The term 'dividing the update event' may denote the process of discontinuing a received update event—in particular an edge update event—and creating sub-events targeting smaller entities (two separate vertices and the edge only, as separate entities), then the update event targeting a linking edge. The sub-events are directed to a first vertex and a second vertex being linked by a linking edge. For each of these items (i.e., first vertex, second vertex, linking edge), a specific sub-event may be created. If one of the two vertices—in particular, the first or the second—does not exist, the missing vertex is created in the target graph, in particular by a specific update event denoted as 'create-if-not-exist sub-events'.

The term 'edge update event' may denote an update of a linking edge, also involving the two connected vertices. I.e., if a linking edge is related to an existing vertex and a non-existing vertex, the non-existing vertex must be created in the target graph before the linking edge information—in particular, defining the relationship between the two vertices—can be integrated or updated in the target graph. In other words, a "create or update edge event" should also include information about the edge, i.e., an edge identifier and relationship properties between the two linked vertices; this may also be denoted as edge type. Each vertex addressed by the edge update event may be addressed by its vertex identifier. In this sense, in edge update event involving also the two link vertices—in particular, their existence—can be seen as a composite event.

The term 'edge update sub-event' may denote that portion of an edge update event directed to the linking edge also including information about the related vertices because each edge is defined and identifiable by a source and a target vertex (and potentially by its relationship type). This may be in contrast to vertices, in the sense that vertices may be identifiable by a vertex identifier in the target graph. However, it may optionally also be possible to assign an edge identifier to an edge for special purposes.—In any case the edge update sub-event comprises the same content details as the original edge update event.

The term 'Apache Kafka® framework' may denote the known open-source stream-processing software platform developed by the Apache Software Foundation. The Apache Kafka and Kafka marks are either registered trademarks or trademarks of the Apache Software Foundation in the United States and other countries. The project aims to provide a unified, high-throughput, low-latency platform for handling real-time data feeds. Its storage layer is essentially a "massively scalable publish/subscribe message queue designed as a distributed transaction log, making it a highly valuable infrastructure for processing streaming data. In the context of the current document, Apache Kafka® frameworks with the version number larger or equal to 0.7 are meant.

The term 'NoSQL' may denote a database providing a mechanism for storage and retrieval of data that is modeled in means other than the tabular relations used in relational databases. Such databases have existed since the late 1960s, but did not obtain the "NoSQL" moniker until a surge of popularity in the early twenty-first century, triggered by the needs of Web 2.0 companies. NoSQL databases are increasingly used in big data and real-time web applications. NoSQL systems are also sometimes called "Not only SQL" to emphasize that they may support SQL-like query languages, or sit alongside SQL database in a polyglot persistence architecture.

The term 'Apache Cassandra™ database' may denote such a NoSQL database. Apache Cassandra™ is a free and open-source, distributed, wide column store, NoSQL database management system designed to handle large amounts of data across many commodity servers, providing high availability with no single point of failure. The Apache Cassandra and Cassandra marks are either registered trademarks or trademarks of the Apache Software Foundation in the United States and other countries. Cassandra™ offers robust support for clusters spanning multiple datacenters, with asynchronous masterless replication allowing low latency operations for all clients. For the purpose of this document Cassandra™ versions 2.1 and above should be considered.

The term 'JanusGraph®' may denote the known scalable distributed graph database optimized for storing and querying graphs containing hundreds of billions of vertices and edges distributed across a multi-machine cluster. The JanusGraph mark is a registered trademark of the Linux Foundation in the United States and other countries JanusGraph® is a transactional distributed graph database that can support thousands of concurrent users executing complex graph traversals in real time. it may be supported by various storage back ends like Apache Cassandra™, Apache HBase™, Google Cloud Bigtable, and Oracle BerkeleyDB.

The term 'hash function' may denote any function that can be used to map data of arbitrary size to data of a fixed size. The values returned by a hash function are called hash values, hash codes, digests, or simply hashes. Hash functions are often used in combination with a hash table, a common data structure used in computer software for rapid data lookup. Hash functions accelerate table or database lookup by detecting duplicated records in a large file. It may also be used to assign a processing for a specific vertex of a target graph to a specific and predefined computer node.

The term 'MurmurHash3 hash function' may denote the known a non-cryptographic hash function suitable for general hash-based lookup. It was created in 2008 and is currently hosted on Github along with its test suite named 'SMHasher'. It also exists in a number of variants, all of which have been released into the public domain. The name comes from two basic operations, multiply (MU) and rotate (R), used in its inner loop.

The proposed computer-implemented method for processing an update event for a target graph may offer multiple advantages and technical effects:

The here proposed concept may ensure that only one target system may be used for a processing of a predefined node in the graph; thus, a 1:1 relationship may exist. A determination of the correct target systems server may be performed by a determination of a hash code based on individual vertex identifying properties, e.g., an identifier of the vertex. A determination of a hash code is a very fast mathematical and/or computational task. Thus, the event stream is only minimally influenced by such an assignment process to different servers. In case of a Kafka® system as event broker, the generated hash code may also be used to choose a Kafka® partition so that—also in this case—the compute load may be spread more or less evenly key across all available compute servers in order to generate a maximum throughput. This may typically be achieved by distributing the received update events as randomly across the compute nodes as possible. This may ensure a most efficient utilization of the compute node's processing power.

This way, a correct timewise sequence of the incoming events may be guaranteed. By splitting an update event relating to an edge event—which relates generally to two vertices and one linking edge—into three basically independent from each other organized sub-events, a timewise correct update sequence of individual vertices is also ensured because of the related updates event are always processed by the same compute node. Integrating the update process by the event broker in the stream of updates events may ensure an update order of properties of a vertex of the target graph. Thus, any "create vertex event", vertex update events or "create-if-not-exist" update events targeting a modification of the same vertex (identified by the same identifier for identifying properties) are processed in the same timewise order as they were sent (or created) by the source system. Categorically, this may only be true for the "create vertex event". For "create-if-not-exist" update events may not hold because these may be sent forth and back in the Kafka® system any may lose its time order. However, that is not a problem for the functioning of the proposed method and system. As a logical consequence, the proposed concept may also avoid creating a vertex—in case it does not exist—twice by different computing nodes.

On the other side, update events that modified different vertices (having different identifying properties, i.e., a different identifier) are unrelated and a processing order does not need to be preserved. As a consequence of the above, a high-throughput stream processing system may be created.

The proposed concept may also have the advantage that both, a source and a target vertex of a linking edge always exists when an edge event—from which it may generally not be known whether the edge update event relates to an existing or a non-existing vertex—is being processed. This is also addressing the existing problem that most NoSQL distributed databases do not have activated (or provide) transactional isolation or consistency checks for performance reasons. This limitation can be overcome by the here proposed solution in a very elegant way and the proposed solution may represents a very efficient solution for a consistency checking.

It may also be noted that—if the Apache Kafka® framework is used as event broker—every received event where the direct it to a Kafka® competition. The partition number will be decided based on the hash algorithm (the one discussed in the context of assigning an update event to a compute node).

Furthermore, an update event comprising two vertices with its properties (i.e., parameters) and all outgoing edges may be processed with the same general concept proposed here. In such a situation, a split can be made in the event to the following chain of events: update event for the vertex with parameters/properties update event for a target vertex for the first edge; an update event for the first edge alone; an update event for the target vertex of the second edge; an update event for the second edge alone; etc.

Thus, also more complex events—in particular one targeting a vertex including all its related/outgoing edges—may be processed in the same way has proposed here. However, the only difference may be the fact that the number of sub-events has increased.

In the following, an additional embodiment—also applicable to the related system—will be described:

According to one embodiment, the method may also include determining that the processing of the first create-if-not-exist sub-event and the second create-if-not-exist sub-event have finished processing, before assigning the edge update sub-event of the integrating edge update sub-event. This may ensure the existence of the vertices linked by the edge to be updated. Thus, it may not happen that an edge may be addressed for which one of the vertices does not exist. It may also be noted that the first sub-event may be removed from the composite event—i.e., the edge update event—after it has been processed. If there is no more sub-event in the composite event then the processing is finished. If the composite event is not empty, it may be set back to the head of the Kafka® topic. From there, the selection, i.e., assignment of a partition number and the related compute node is performed.

Additionally, the processing of regular events (non-composite edge update events, i.e., a create-if-not-exist" update or vertex) may be the same as a processing of a composite event including one sub-event only. The event may simply be stored in the database in the processing may be finished.

According to one advantageous embodiment of the method, the event broker may be a component of an Apache Kafka® framework. The inventive concept may work with a Kafka® system version 0.7 and above. In other embodiments of the method, usage of other stream processing frameworks may also be possible. As known, the Kafka® framework may maintain the timewise ordering of event processing within a single partition, i.e., processing by a compute node.

It may also be noted that at "create-have-not-exist", i.e., a composite update event may be sent through the Kafka® framework—is used—three times instead of only one under normal conditions and without the proposed concept. The Kafka® framework, however, is fast enough compared to other components—such as the database for storing the target graph—therefore, the impact of the performance may be kept at a minimum.

According to one permissive embodiment of the method, the target graph may be based on a NoSQL distributed database. Storing and managing graphs comprising vertices and linking edges may be a straightforward task in a NoSQL distributed database.

According to one useful embodiment of the method, the NoSQL distributed database, may be an Apache Cassandra™ database. The version of the Cassandra™ database should be 2.1 or higher. This may ensure a proper interaction with the streaming framework.

According to another useful embodiment of the method, the target graph is a distributed graph database such as, JanusGraph®. The usage of this type of target graph has been well studied and may represent a good fit with a streaming framework and stream processing.

According to one advantageous embodiment of the method, the assigning of a vertex update event to a computer node may be based on a result of a hash function. Determining results of has for hash functions may not require heavy computing on the compute nodes, so that a determination of the correct computer node for an update event may be sourced and straightforward way, not requiring intensive compute resources, thus, they proposed solution may represent a lean and high-performing approach. It may also be noted that the hash code value of a composite event—in edge update event—is always equal to the hash code of the first sub-event.

According to one allowed embodiment of the method, the hash function is a MurmurHash3 hash function. The MurmurHash3 is the successor of the MurmurHash2 function and is available in a 32-bit version targeting low latency for hash tables is used in, two 128-bit versions for generating unique identifiers for large blocks of data, one each for x86 and x64 platforms. Thus, typical computing environments may be well supported.

According to an optional embodiment of the method, assigning the edge update sub-event to the third compute node also includes determining the third compute node using a hash function, wherein input values for the hash function include: a first vertex identifier relating to the first vertex, a second vertex identifier relating to the second vertex and a type of the edge corresponding to the edge update sub-event as input values. This way, is may be ensured that the same edge may always be processed by the same computing node. This may be a helpful feature if the NoSQL database has consistency of performance problems when simultaneously creating updating the same edge on two different computer nodes.

As a further embodiment it may be possible to use internal identifiers of vertices of the NoSQL database. These internal identifiers may typically be generated by the NoSQL database during a creation of a new vertex. Given that of each vertex may have an assigned identifier different to the internal identifier of the NoSQL database, it may be useful to replace the original vertex identifier by the internal identifier, resulting in a much faster processing and subsequent database operations because no translation "external identifier" to "internal identifier" is required.

In the following, a detailed description of the figures will be given. All instructions in the figures are schematic. Firstly, a block diagram of an embodiment of the inventive computer-implemented method for processing an update event for a target graph is given. Afterwards, further embodiments, as well as embodiments of the system for processing an update event for a target graph, will be described.

Figure 1:
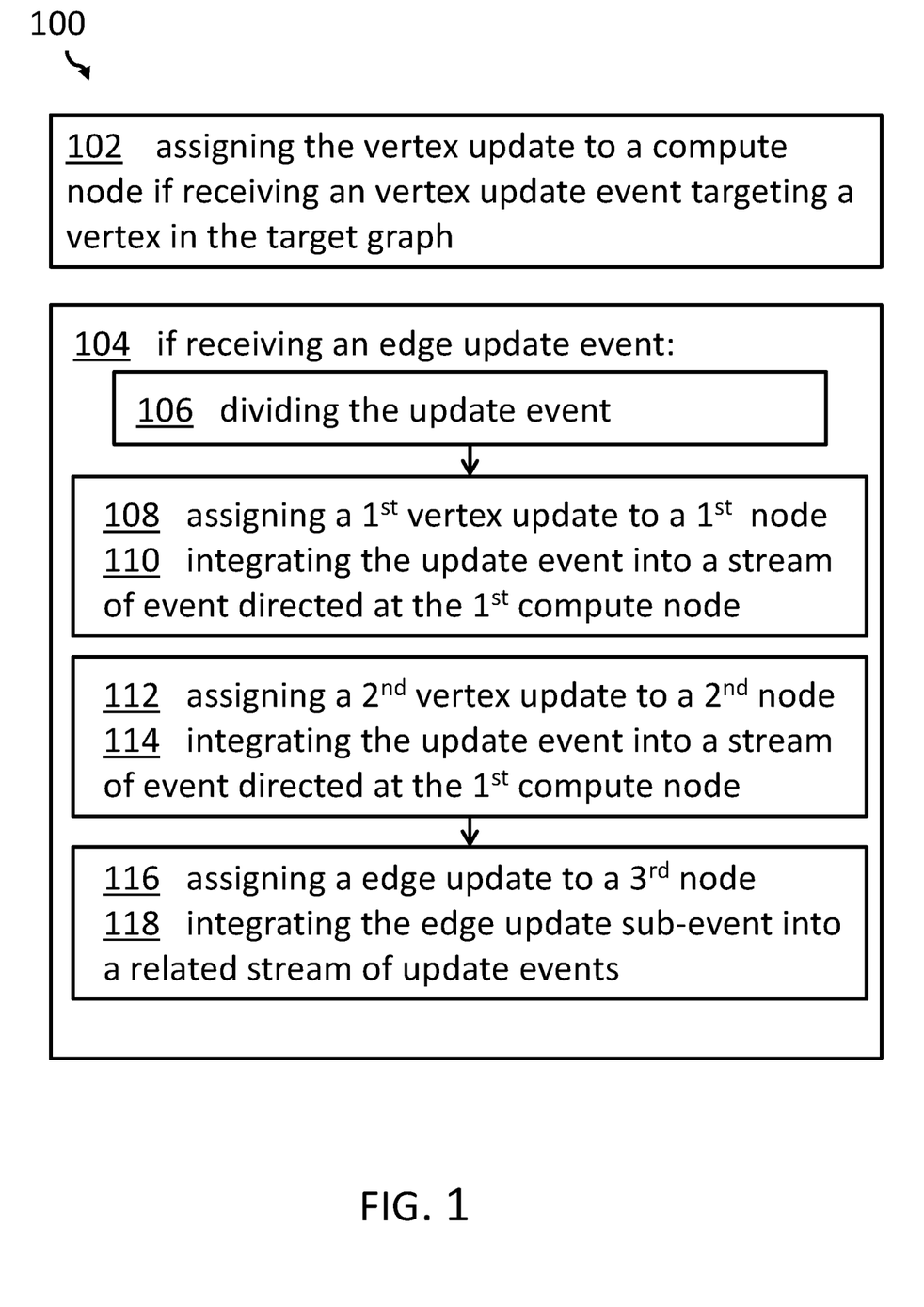
FIG. 1 shows a block diagram of an embodiment of the inventive computer-implemented method for processing an update event for a target graph.

FIG. 1 shows a block diagram of an embodiment of the computer-implemented method 100 for processing an update event, directed at vertices and/or edges, for a—in particular a distributed—target graph comprising a plurality of vertices. Relating to the vertices there may be defined a plurality of properties with related property values. The linking edges may have only one meaning, i.e., property, e.g., "belongs to", "is married to", "depends on", "son of", like in typical entity relationship. The linking edges are connecting vertices out of the plurality of vertices. I.e., between two defined vertices more than one linking edge expressing different relationship types between the two vertices may exist, i.e., the edges have to be of different type, i.e., have a different type property. The reason is simple: because an edge is defined by respective identifiers of their source vertex and their target vertex as well as the relationship type, there needs to be one distinguishing parameter; thus, if the two identifiers are identical, the property "type of the edge" needs to be different.

The method 100 includes a series of activities: upon an event broker—for example an Apache Kafka® event broker—receiving a vertex update event targeting a vertex in the target graph, the activities include assigning, 102, by the event broker, the vertex update event to a compute node which processes all update events for the vertex. Thereby, the vertex update event includes an update parameter value for a property of the vertex. Thus, the same compute node processes always the update event for the named vertex.

Upon the event broker receiving, 104, an update event targeting a linking edge in the target graph, the activities include performing, by the event broker: dividing, 106, the update event into a pair of create-if-not-exist sub-events, one of which relates to a first vertex of a vertex pair and the other relates to a second vertex of a vertex pair, and an edge update sub-event. it may be noted that the create-if-not-exist sub-event is a special vertex update event, adapted for generating a new vertex in the graph target if the vertex does not already exist.

Then, the first create-if-not-exist sub-event directed at the first vertex as assigned, 108, to a first compute node relating to all update events for the first vertex. Additionally, the first create-if-not-exist sub-event is integrated, 110, into a stream of update events for the first vertex. Thereby, a double vertex creation can elegantly be prevented.

In a similar way, the second create-if-not-exist sub-event directed at a second vertex is assigned, 112, to a second compute node relating to all update events for the second vertex, and the second create-if-not-exist sub-event is integrated, 114, into a stream of update events for the second vertex. Thereby, a double vertex creation for the second compute node can also be prevented.

Furthermore, the method 100 comprises assigning, 116, the edge update sub-event directed at a linking edge between the first vertex and the second vertex to a third compute node. This third compute node may be chosen randomly or according to any other predefined rule. However, it may not be required to direct update events relating to specific linking edges to a predefined compute node. Thus, the usage of a hash function is not required here. This may decrease the computer requirements even more. If, on the other side, an efficient hash code calculation is used, a random distribution of "create edge" tasks ensures equal workloads across the compute nodes which in turn allows a more efficient cluster computing power usage.

Last but not least, the edge update sub-event is integrated, 118, into a related stream of update events. This may ensure the time-wise consistency of the incoming edge update events.

Figure 2:
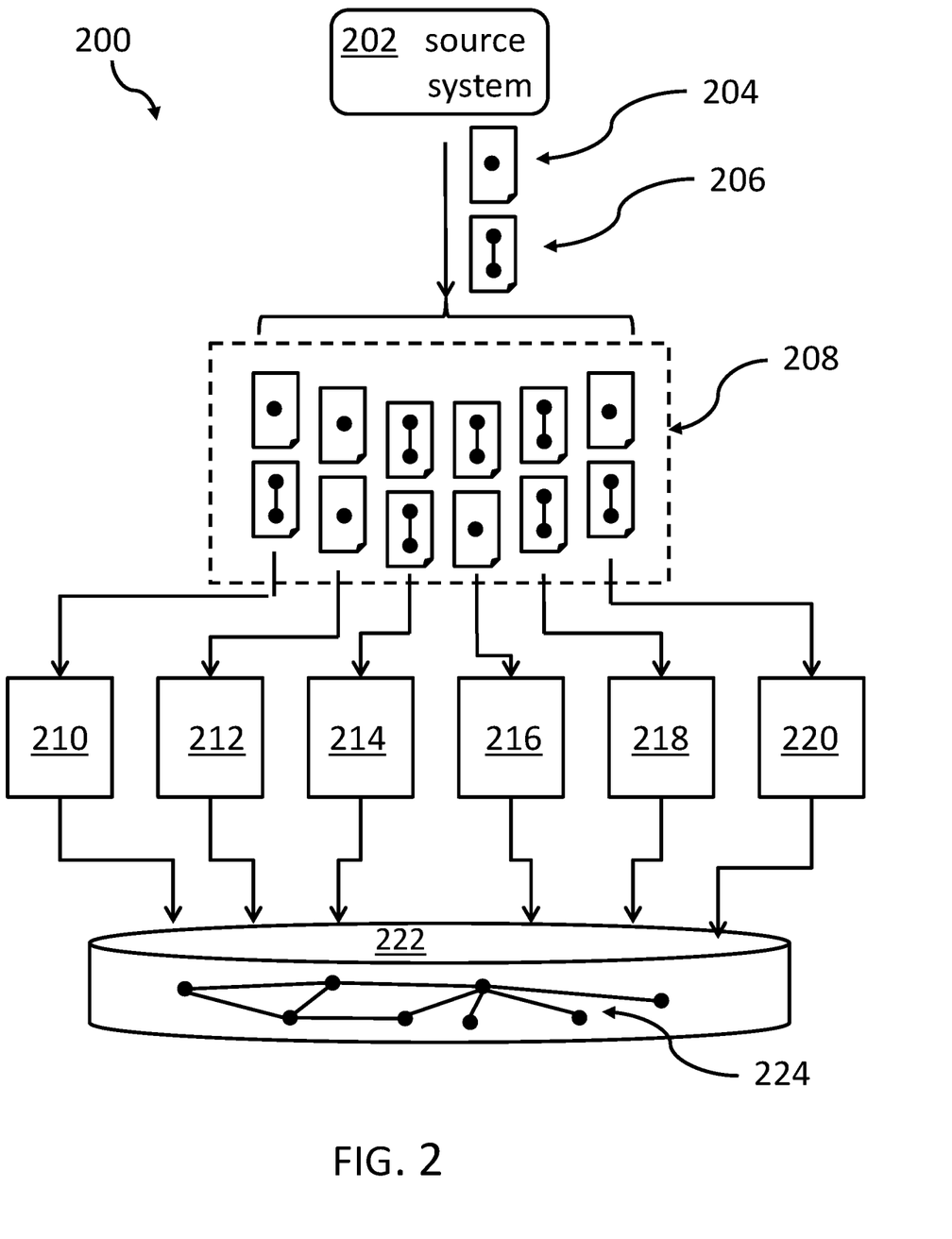
FIG. 2 shows a block diagram of an embodiment of physical components instrumental for the proposed method.

FIG. 2 shows a block diagram an embodiment 200 of physical components instrumental for the proposed method 100. One or more source systems 202 generate update events. These may be directed to a vertex, i.e., a vertex update event 204 (symbolized by one dot) or an edge update event 206 (symbolized by two dots and a connection). The events 204, 206 may be received in a large number, i.e., an event stream, at an event broker 208. Different ones of the update events are assigned to different compute nodes 210, 212, . . . , 220 for processing.

The assignment of the different update events to specific compute nodes 210, 212, . . . , 220 is organized as explained in the context of FIG. 1. The processing in the different compute nodes results in an update of nodes or edges in the target graph 224 stored in the database 222, e.g., a NoSQL database like Apache Cassandra™.

Figure 3:
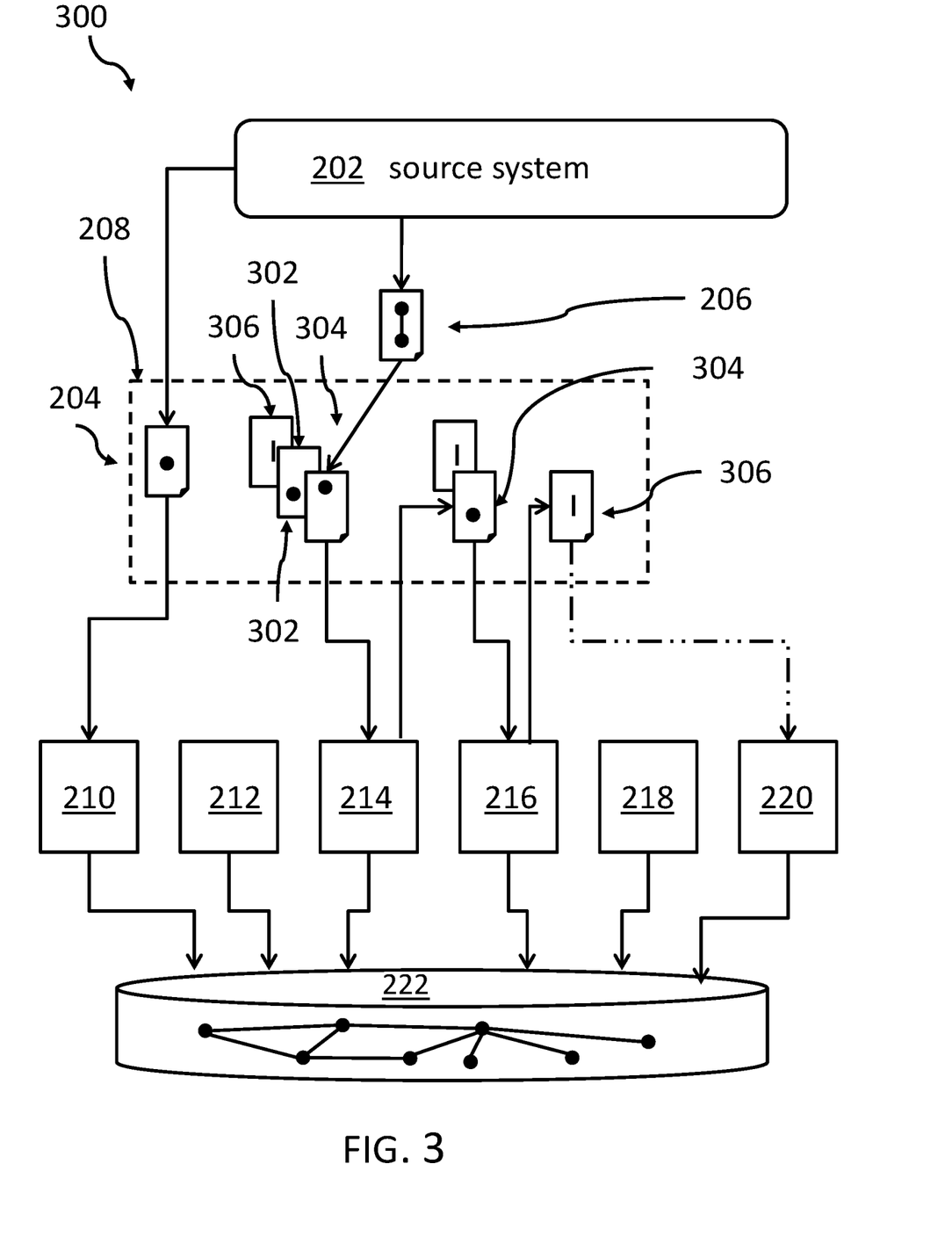
FIG. 3 shows a stream diagram of an embodiment of how the event stream may be split according to the inventive concept.

FIG. 3 shows a sort of stream diagram 300 of an embodiment of how the event stream may be split according to the inventive concept. The vertex update event 204 is assigned, by the event broker system 208, to its dedicated server, e.g., compute node 210. This assignment may be based on a hash algorithm.

However, the edge update event 206 is split into three sub-update-events 302, 304 and 306, for a first vertex (lower dot in message symbol), a second vertex (upper dot in message symbol), and the linking edge (symbolized as straight short vertical line in the respective message symbol), respectively. In a first step, the composite event (302, 304, 306) is handed over to the first compute node, by which only the update event for the first compute node (here exemplary compute node 214) is processed. The remaining sub-events 304 and 306 go back to the assignment process to be assigned to their respective compute nodes.

In a second step, the vertex update sub-event 304 is assigned to the second compute node 216, chosen by the related hash function. This leaves the remaining edge event 306 to be assigned to the (e.g., randomly chosen) third compute node, here 220, for processing. At this point in time, it is ensured that the vertices linked by the edge exist.

This way, the timewise sequence of update events—in particular vertex update events and edge update events—directed to specific constituents is performed in the correct time order of its creation. It may also be mentioned that specific vertex update events are used in case vertex update events are generated as sub update events in case of an edge update event. These specific vertex update events are denoted "create-if-not-exist". As the name suggests, related vertices can be created before specific parameter value updates are performed for these vertices, and before the edge connecting the related vertices is updated.

By ensuring that the edge update sub-event is only then assigned to a compute node after the "create-is-not-exist" update events to related vertices have been performed, it is ensured that the nodes relating to a linking edge and its update event do exist. Thus, no exceptions are triggered because a vertex does not exist when the edge update event is processed. This mechanism can ensure a high performance of the proposed concept.

An exemplary event flow may illustrate the proposed concept from a practical point of view:

1. In the source system a new edge is created:
John Smith (04a998ba-ef46-4e20-b08d-77b74755c1c8) →marriedTo→Mary O'Brian (6d3d247d-8007-4c0e-b4ea-51fd0f37ffc6).

The source vertex has, e.g., the following ID: 04a998ba-ef46-4e20-b08d-77b74755c1c8 (fixed). The target vertex has, e.g., the following ID: 6d3d247d-8007-4c0e-b4ea-51fd0f37ffc6 (fixed). The edge type is: "marriedTo".

2. In a response the source system publishing a new composite event to Kafka® topic: the composite event CE1 comprises:
1 create vertex with ID="04a998ba-ef46-4e20-b08d-77b74755c1c8", no properties;
2 create vertex with ID="6d3d247d-8007-4c0e-b4ea-51fd0f37ffc6", no properties;
3 create edge: source="04a998ba-ef46-4e20-b08d-77b74755c1c8", target="6d3d247d-8007-4c0e-b4ea-51fd0f37ffc6", type="marriedTo".

3. A Kafka® partitioner calculates an event hash code for the composite event based on first sub-event:
composite event CE1 HASH=-490366777;
1 create vertex with ID="04a998ba-ef46-4e20-b08d-77b74755c1c8", no properties, HASH=-490366777 (based on string: "04a998ba-ef46-4e20-b08d-77b74755c1c8");
2 create vertex with ID="6d3d247d-8007-4c0e-b4ea-51fd0f37ffc6", no properties;
3 create edge: source="04a998ba-ef46-4e20-b08d-77b74755c1c8", target="6d3d247d-8007-4c0e-b4ea-51fd0f37ffc6", type="marriedTo".

The hash codes for the sub-events #2 and #3 are not needed at this point.

4. The event CE1 is consumed by one of the target system nodes (e.g., compute node) tied to the Kafka® partition (KP1) that received the event. As a result a new vertex with ID="04a998ba-ef46-4e20-b08d-77b74755c1c8", no properties, is stored in the database if it does not already exists.

Then Target System publishes a new follow up event back to Kafka®:
composite event CE2 HASH=-1836967732;
1 create vertex with ID="6d3d247d-8007-4c0e-b4ea-51fd0f37ffc6", no properties, HASH=-1836967732 (based on string: "6d3d247d-8007-4c0e-b4ea-51fd0f37ffc6");
2 create edge: source="04a998ba-ef46-4e20-b08d-77b74755c1c8", target="6d3d247d-8007-4c0e-b4ea-51fd0f37ffc6", type="marriedTo".

5. The event CE2 is received by some other Kafka® partition (KP2) and then consumed by some other Target system node (compute node 2).

As a result, a new vertex with ID="6d3d247d-8007-4c0e-b4ea-51fd0f37ffc6", no properties, is stored in the database (or updated if already existed).

Then Target system publishes a new follow up event back to Kafka®:
composite event CE3 HASH=-1490297036;
1 create edge: source="04a998ba-ef46-4e20-b08d-77b74755c1c8", target="6d3d247d-8007-4c0e-b4ea-51fd0f37ffc6", type="marriedTo" HASH=-1490297036 (random).

6. The event CE3 is received by some other Kafka® partition (KP3) and then consumed by some other Target system node (compute node 3).

As a result a new edge with (source="04a998ba-ef46-4e20-b08d-77b74755c1c8", target="6d3d247d-8007-4c0e-b4ea-51fd0f37ffc6", type="marriedTo") is stored in the database (or updated if already existed).

At this point the processing is complete.

Figure 4:
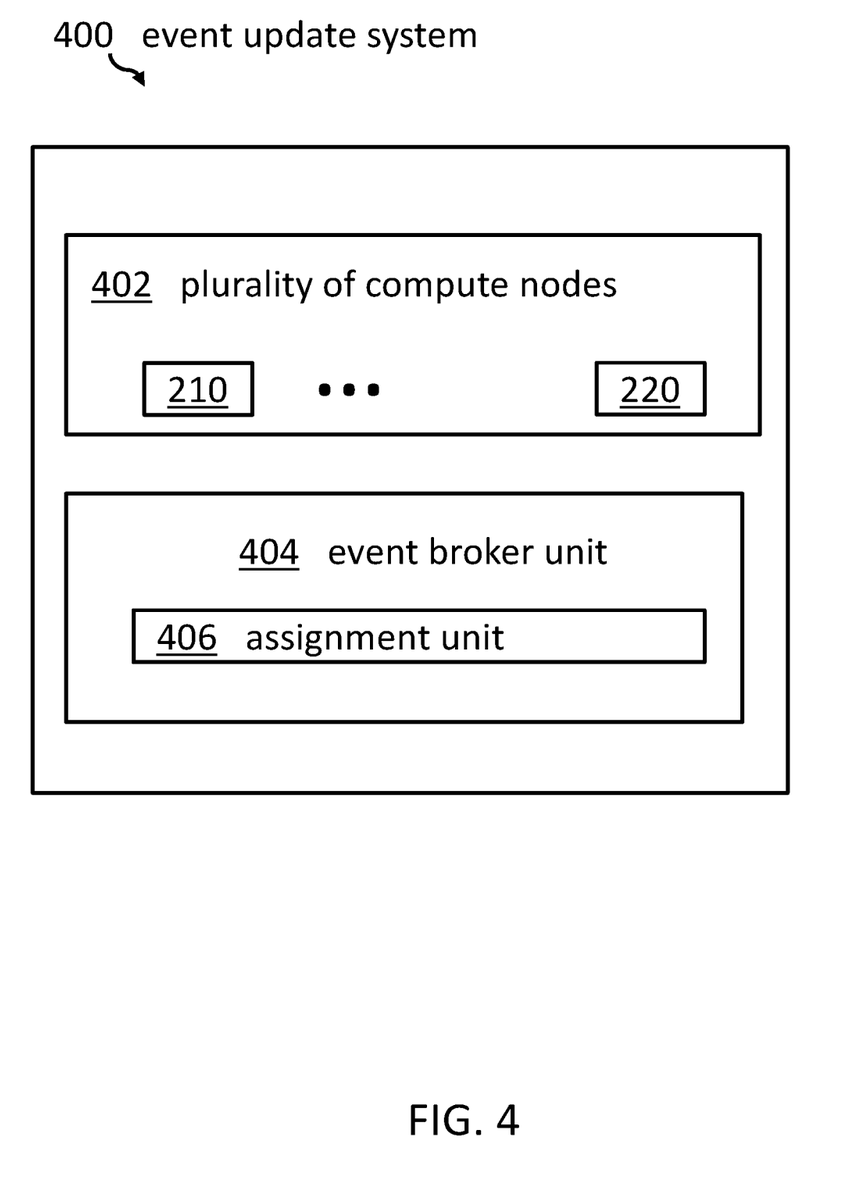
FIG. 4 shows an embodiment of event update system for processing an update event for a target graph.

FIG. 4 shows a block diagram of the event update system 400 for processing an update event for a target graph comprising a plurality of vertices and linking edges between vertices of vertex pairs comprised in the plurality of vertices. The event update system 400 comprises a plurality 402 of compute nodes 210, 212, . . . , 220, and an event broker unit 404 adapted for: upon the event broker unit receiving a vertex update event targeting a vertex in the target graph. The vertex update event comprises an update parameter value for a property of the vertex and the event broker unit comprises an assignment unit 406 adapted for assigning the vertex update event to a dedicated compute node out of the plurality 402 of compute nodes 210, . . . 220. The dedicated compute node is adapted for processing all update events for a specific predefined vertex.

The event broker unit 404 is also adapted for: upon the event broker receiving an update event targeting a linking edge in the target graph, and wherein the event broker unit is also adapted for performing: (a) dividing the update event into a pair of create-if-not-exist sub-events, one of which relates to a first vertex of a vertex pair and the other relates to a second vertex of a vertex pair, and an edge update sub-event, (b) assigning the first create-if-not-exist sub-event directed at a first vertex to a first compute node out of the plurality of compute nodes, the first compute node relating to all update events for the first vertex, (c) integrating the first create-if-not-exist sub-event into a stream of update events for the first vertex, (d) assigning the second create-if-not-exist sub-event directed at a second vertex to a second compute node out of the plurality of compute nodes, the second compute node relating to all update events for the second vertex, (e) integrating the second create-if-not-exist sub-event into a stream of update events for the second vertex, (f) assigning the edge update sub-event directed at a linking edge between the first vertex and the second vertex to a third compute node out of the plurality of compute node, and (g) integrating the edge update sub-event into a related stream of update events.

Figure 5:
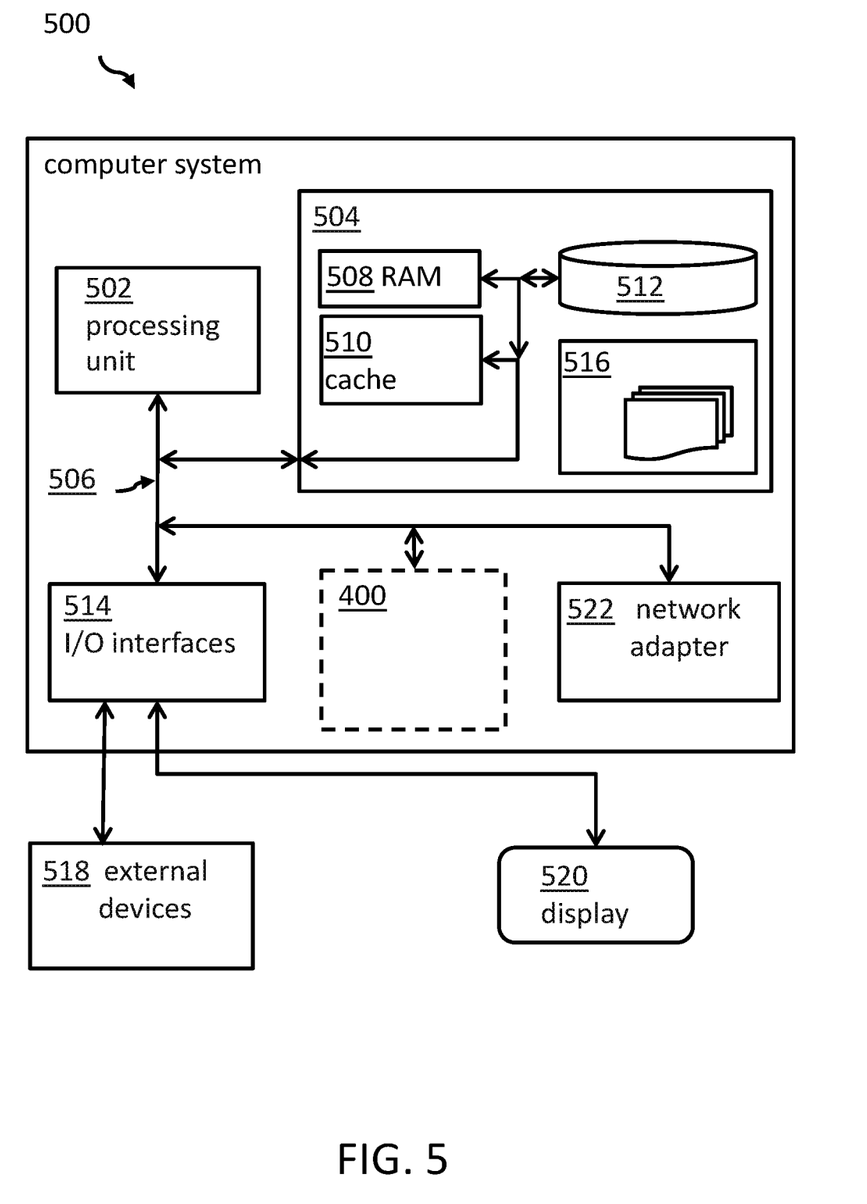
FIG. 5 shows an embodiment of a computing system comprising the event update system according to FIG. 4.

Embodiments of the invention may be implemented together with virtually any type of computer, regardless of the platform being suitable for storing and/or executing program code. FIG. 5 shows, as an example, a computing system 500 suitable for executing program code, e.g., the event broker, related to the proposed method.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 706 that couple various system components including system memory 504 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the event update system 400 for processing an update event for a target graph may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
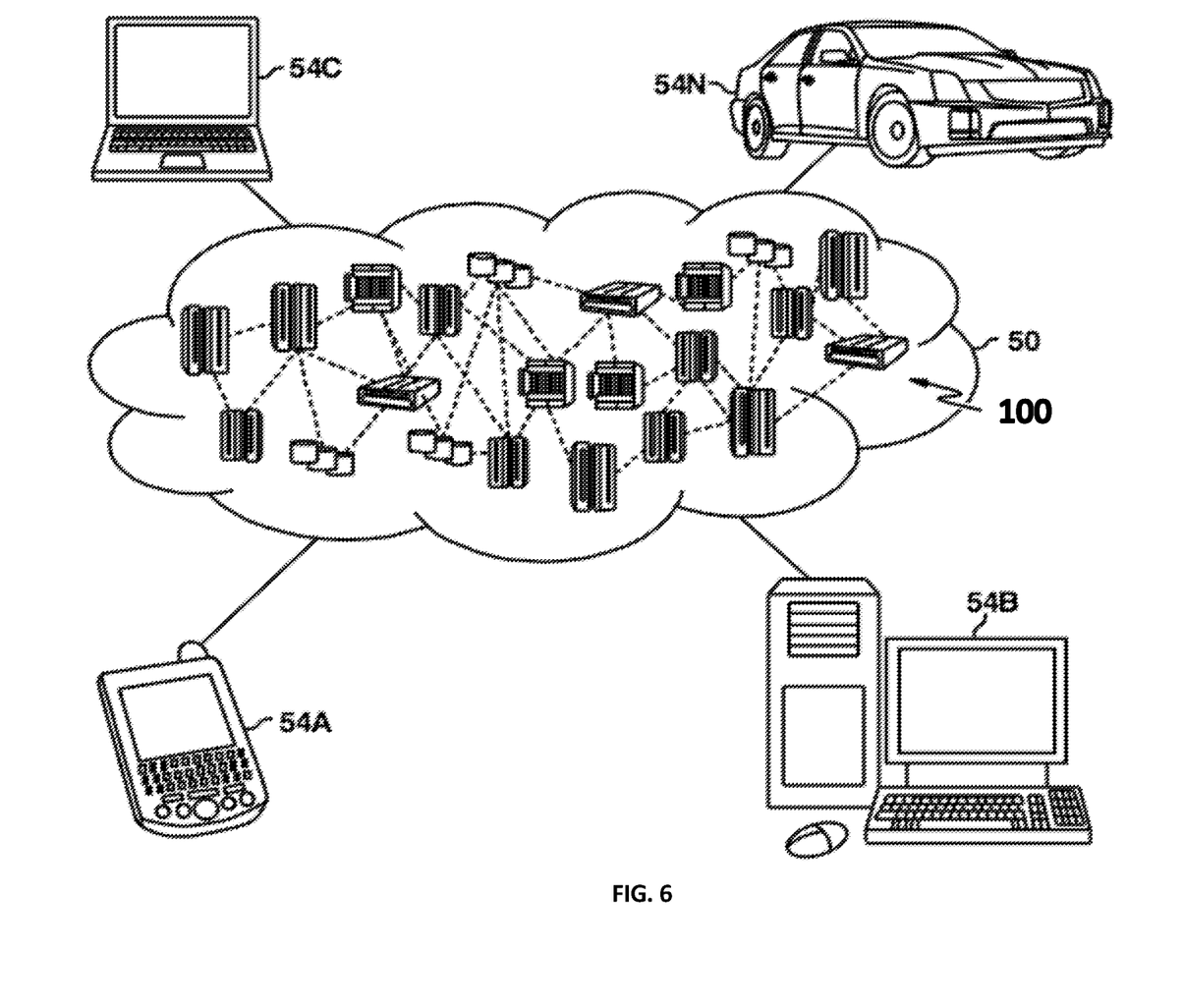
FIG. 6 depicts a cloud computing environment in accordance with an embodiment of the present invention.

Referring now to FIG. 6, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
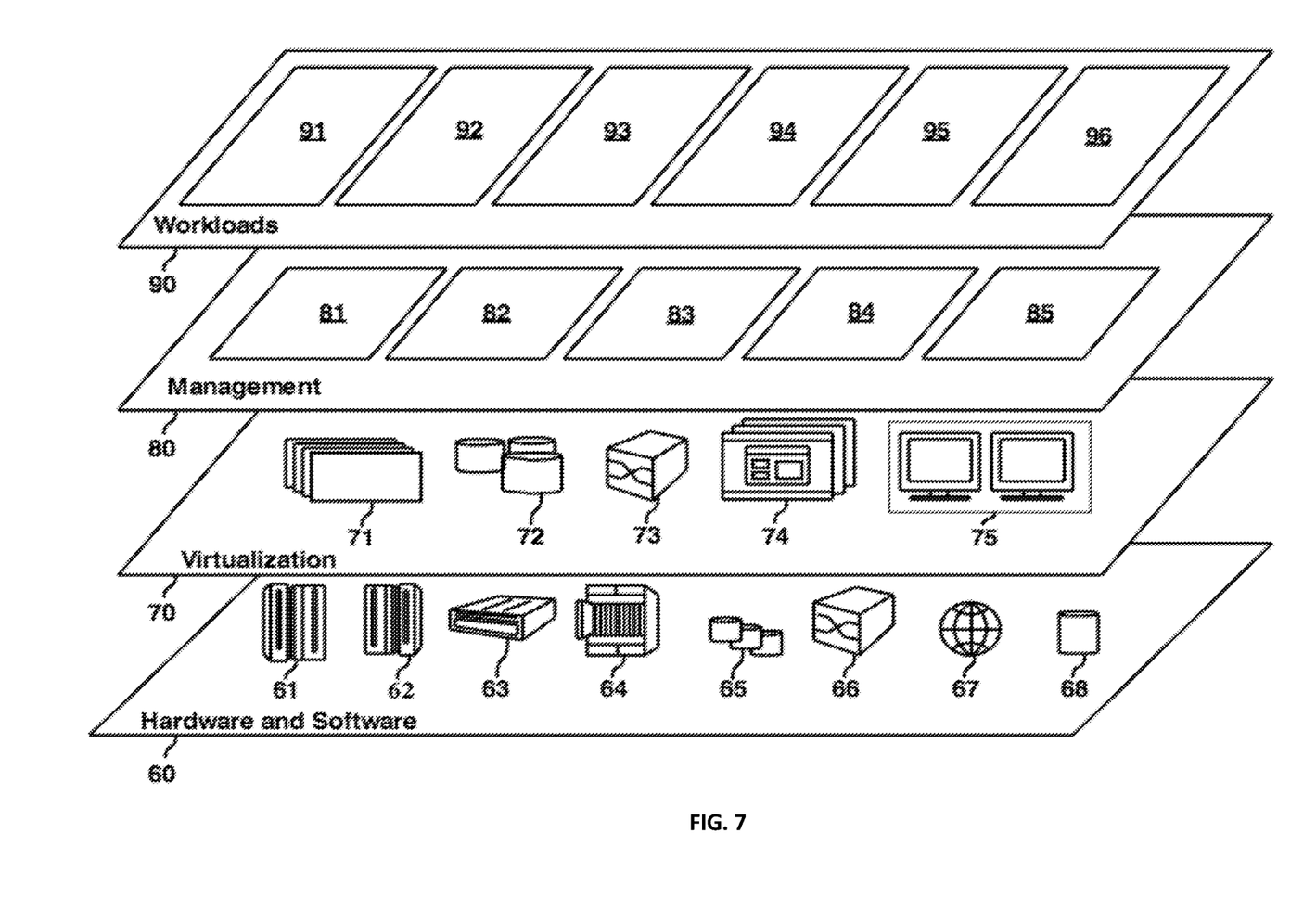
FIG. 7 depicts abstraction model layers in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and update event processing system 96. Update event processing system 96 may relate to processing an update event for a target graph may be provided. The target graph may include a plurality of vertices and linking edges between vertices of vertex pairs included in the plurality of vertices.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for processing an update event for a target graph comprising a plurality of vertices and linking edges between vertices of vertex pairs comprised in said plurality of vertices, the method comprising:
   upon an event broker receiving a vertex update event, targeting a vertex in the target graph, wherein the vertex update event comprises an update parameter value for a property of the vertex;
   assigning, by the event broker, the vertex update event to a compute node which processes update events for the vertex;
   upon the event broker receiving an update event targeting a linking edge in the target graph, performing by the event broker:
      dividing the update event into a pair of first and second create-if-not-exist sub-events, wherein the first sub-event of the pair relates to a first vertex of a vertex pair, and wherein the second sub-event of the pair relates to a second vertex of the vertex pair, and an edge update sub-event;
      assigning the first sub-event directed at the first vertex to a first compute node relating to update events for the first vertex;
      integrating the first sub-event into a stream of update events for the first vertex;
      assigning the second sub-event directed at the second vertex to a second compute node relating to update events for the second vertex;
      integrating the second sub-event into a stream of update events for the second vertex;
      assigning the edge update sub-event directed at a linking edge between the first vertex and the second vertex to a third compute node; and
      integrating the edge update sub-event into a related stream of update events.

2. The method of claim 1, further comprising:
   determining that processing of the first sub-event and the second sub-event is complete, before assigning the edge update sub-event.

3. The method of claim 1, wherein the event broker is a component of a stream-processing software platform.

4. The method of claim 1, wherein the target graph is based on a NoSQL distributed database.

5. The method of claim 1, wherein the target graph is a distributed graph database.

6. The method of claim 1, wherein the assigning of the vertex update event to the compute node which processes update events for the vertex is based on a result of a hash function.

7. The method of claim 6, wherein the hash function is a MurmurHash3 hash function.

8. The method of claim 1, wherein assigning the edge update sub-event to the third compute node further comprises:
   determining the third compute node using a hash function, wherein input values for the hash function comprise a first vertex identifier relating to the first vertex, a second vertex identifier relating to the second vertex, and a type of the linking edge between the first vertex and the second vertex.

9. A computer system for processing an update event for a target graph, wherein the target graph comprises a plurality of vertices and linking edges between vertices of vertex pairs within the plurality of vertices, the computer system comprising:
   one or more compute nodes, one or more computer-readable memories, one or more computer-readable tangible storage devices, and program instructions stored on at least one of the one or more computer-readable tangible storage devices for execution by at least one of the one or more compute nodes via at least one of the one or more memories, the program instructions comprising:
      upon receiving a vertex update event, program instructions to target a vertex in the target graph, wherein the vertex update event comprises an update parameter value for a property of the vertex;
      program instructions to assign the vertex update event to a dedicated compute node out of the plurality of compute nodes, wherein the dedicated compute node processes update events for the vertex;
      upon receiving an update event, program instruction to target a linking edge in the target graph;
      program instructions to divide the update event into a pair of first and second create-if-not-exist sub-events, wherein the first sub-event of the pair relates to a first vertex of a vertex pair, and wherein the second sub-event of the pair relates to a second vertex of the vertex pair, and an edge update sub-event;
      program instructions to assign the first sub-event directed at the first vertex to a first compute node out of the plurality of compute nodes, wherein the first compute node relates to update events for the first vertex;
      program instructions to integrate the first sub-event into a stream of update events for the first vertex;
      program instructions to assign the second sub-event directed at a second vertex to a second compute node out of the plurality of compute nodes, wherein the second compute node relates to update events for the second vertex;

program instructions to integrate the second sub-event into a stream of update events for the second vertex;

program instructions to assign the edge update sub-event directed at a linking edge between the first vertex and the second vertex to a third compute node out of the plurality of compute nodes; and program instructions to integrate the edge update sub-event into a related stream of update events.

10. The computer system of claim 9, further comprising:
program instructions to determine that processing of the first sub-event and the second sub-event is complete, before assigning the edge update sub-event.

11. The computer system of claim 9, wherein the program instructions execute as a component of a stream-processing software platform.

12. The computer system of claim 9, further comprising:
program instructions to store the target graph within a storage system comprising a NoSQL distributed database.

13. The computer system of claim 9, wherein the target graph is a distributed graph database.

14. The computer system of claim 9, wherein program instructions to assign the vertex update event to the dedicated compute node are based on a result of a hash function.

15. The computer system of claim 14, wherein the hash function is a MurmurHash3 hash function.

16. The computer system of claim 9, wherein program instructions to assign the edge update sub-event to the third compute node further comprises:

program instructions to determine the third compute node using a hash function, wherein input values for the hash function comprise: a first vertex identifier relating to the first vertex, a second vertex identifier relating to the second vertex, and a type of the linking edge between the first vertex and the second vertex.

17. A computer program product for processing an update event for a target graph, wherein the target graph comprises a plurality of vertices and linking edges between vertices of vertex pairs within the plurality of vertices, the computer program product comprising:

one or more computer-readable tangible storage devices and program instructions stored on at least one of the one or more computer-readable tangible storage devices, the program instructions comprising:

upon receiving a vertex update event, program instructions to target a vertex in the target graph, wherein the vertex update event comprises an update parameter value for a property of the vertex;

program instructions to assign the vertex update event to a compute node which processes update events for the vertex;

upon receiving an update event, program instruction to target a linking edge in the target graph;

program instructions to divide the update event into a pair of first and second create-if-not-exist sub-events, wherein the first sub-event of the pair relates to a first vertex of a vertex pair, and wherein the second sub-event of the pair relates to a second vertex of the vertex pair, and an edge update sub-event;

program instructions to assign the first sub-event directed at the first vertex to a first compute node, wherein the first compute node relates to update events for the first vertex;

program instructions to integrate the first sub-event into a stream of update events for the first vertex;

program instructions to assign the second sub-event directed at a second vertex to a second compute node, wherein the second compute node relates to update events for the second vertex;

program instructions to integrate the second sub-event into a stream of update events for the second vertex;

program instructions to assign the edge update sub-event directed at a linking edge between the first vertex and the second vertex to a third compute node; and program instructions to integrate the edge update sub-event into a related stream of update events.

18. The computer program product of claim 17, further comprising:
program instructions to determine that processing of the first sub-event and the second sub-event is complete, before assigning the edge update sub-event.

19. The computer program product of claim 17, wherein the program instructions execute as a component of a stream-processing software platform.

20. The computer program product of claim 17, further comprising:
program instructions to store the target graph within a storage system comprising a NoSQL distributed database.

* * * * *